May 29, 1923.

L. V. FRALEY 1,456,726

TAKE-UP AND ADJUSTABLE ROLLER

Original Filed April 12, 1919    5 Sheets-Sheet 1

Inventor
Laurence V. Fraley
By Brown Boettcher & Steiner
Attorneys

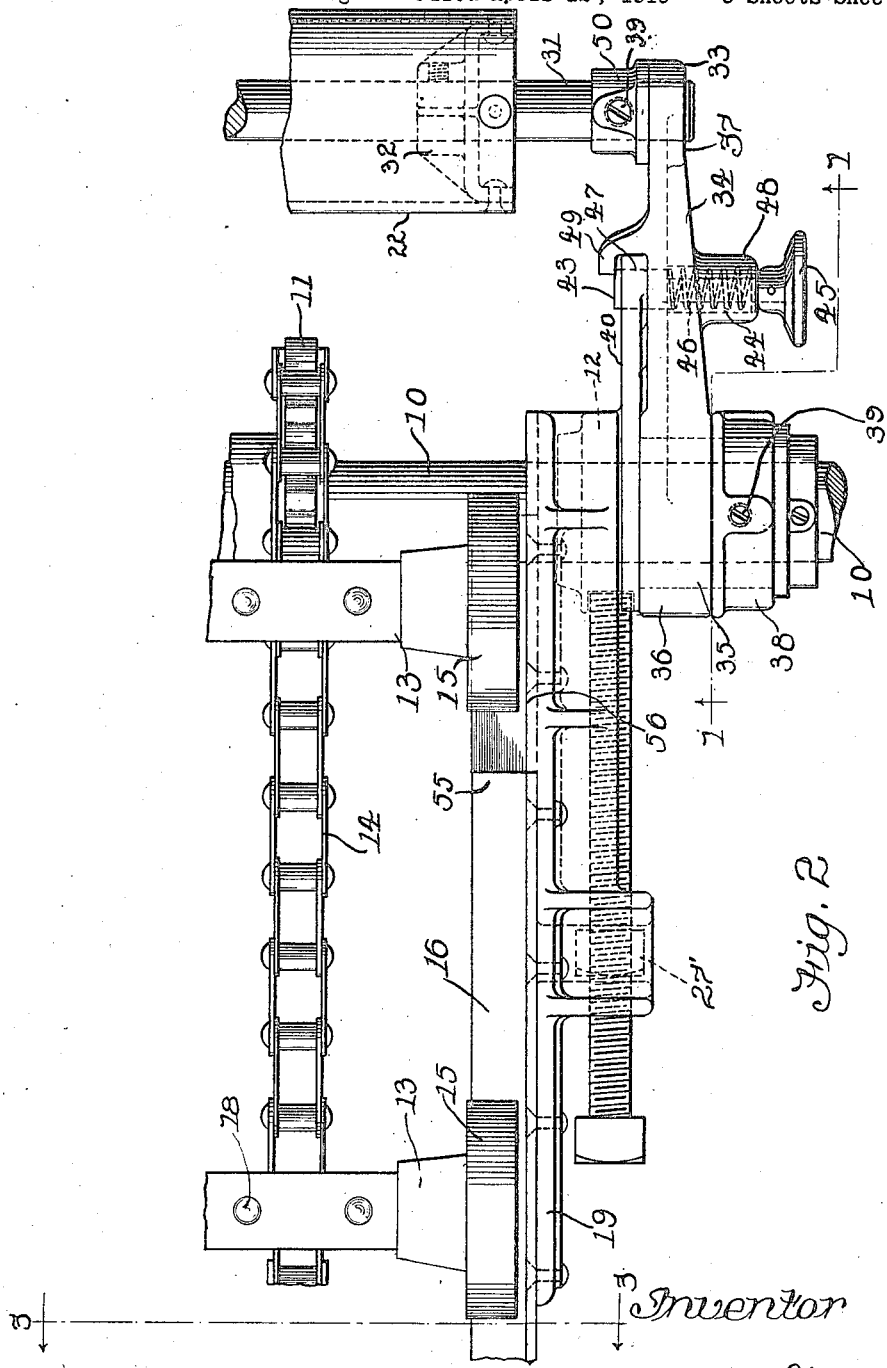

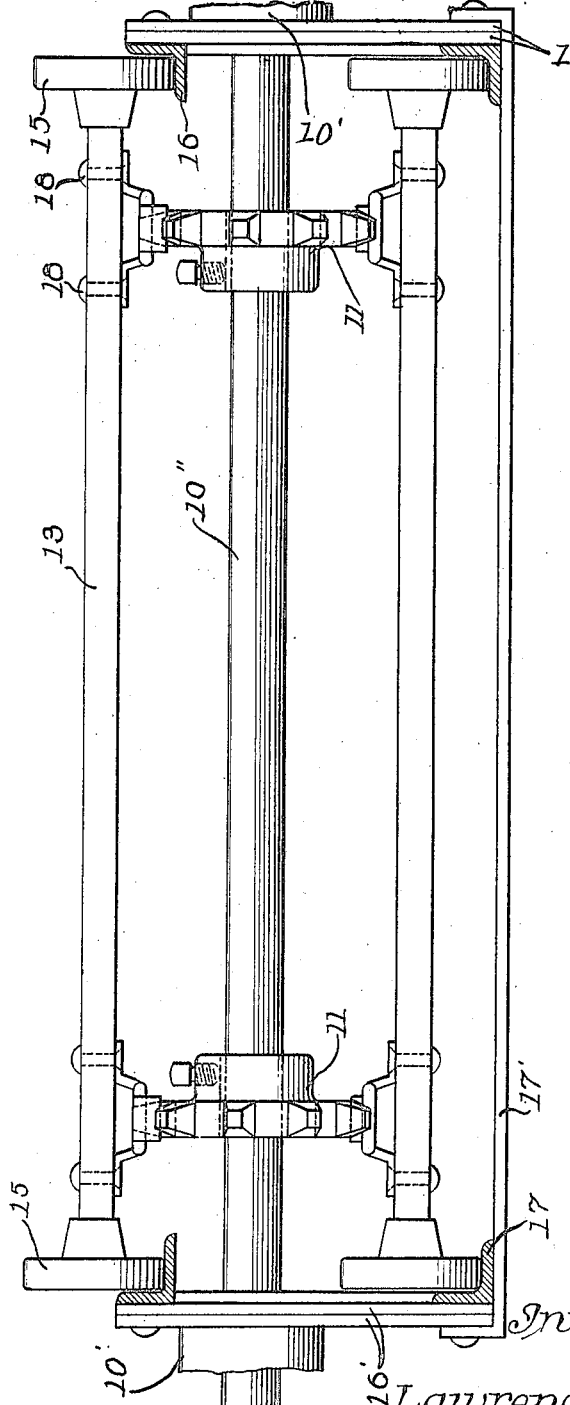

May 29, 1923.
L. V. FRALEY
TAKE-UP AND ADJUSTABLE ROLLER
Original Filed April 12, 1919    5 Sheets-Sheet 4
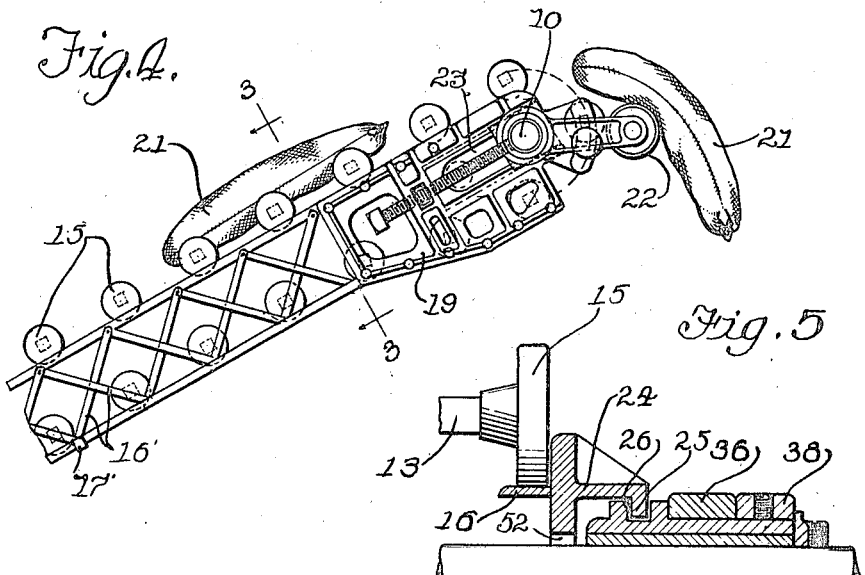
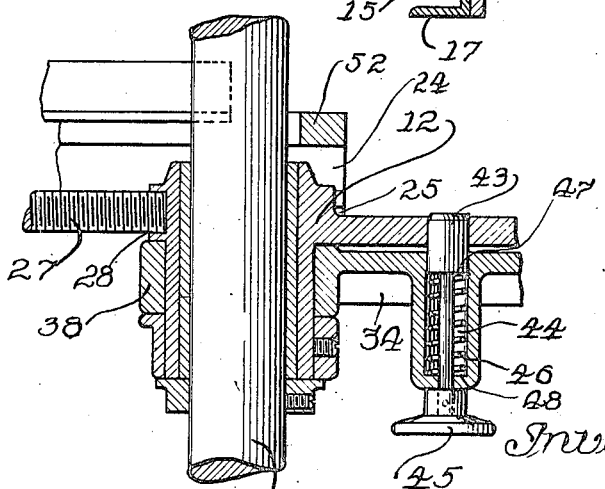
Inventor
Lawrence V. Fraley
By Brown Boettcher & Dienner
Attorneys May 29, 1923.
L. V. FRALEY
TAKE-UP AND ADJUSTABLE ROLLER
Original Filed April 12, 1919    5 Sheets-Sheet 5
1,456,726
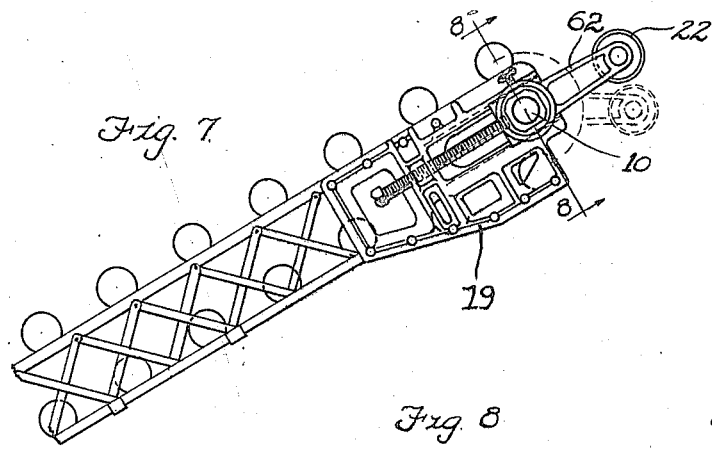
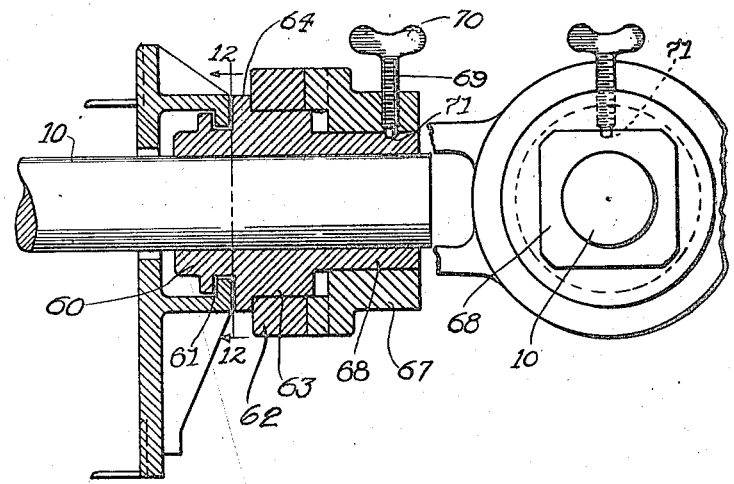
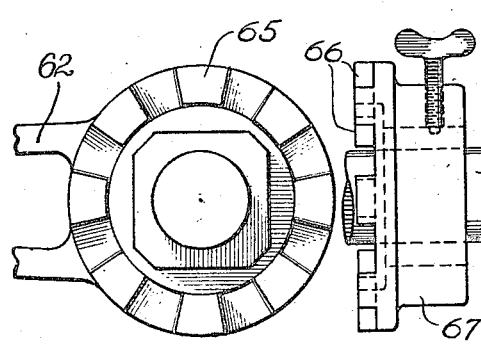
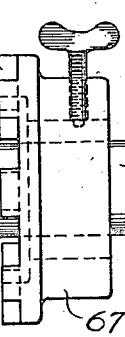
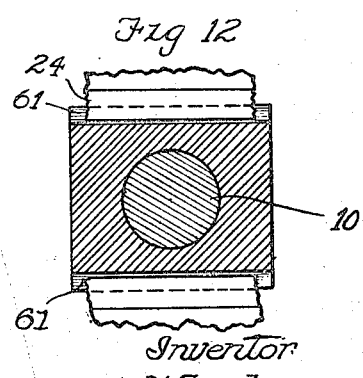
Inventor
Lawrence V. Fraley
By Brown Boettcher & Olwine
Attorneys.

Patented May 29, 1923.

1,456,726

UNITED STATES PATENT OFFICE.

LAWRENCE V. FRALEY, OF CHICAGO, ILLINOIS, ASSIGNOR, BY MESNE ASSIGNMENTS, TO STANDARD CONVEYOR COMPANY, OF NORTH ST. PAUL, MINNESOTA, A CORPORATION OF MINNESOTA.

TAKE-UP AND ADJUSTABLE ROLLER.

Application filed April 12, 1919, Serial No. 289,685. Renewed April 16, 1923.

*To all whom it may concern:*

Be it known that I, LAWRENCE V. FRALEY, a citizen of the United States, residing at Chicago, in the county of Cook and State of Illinois, have invented a certain new and useful Improvement in Take-Up and Adjustable Rollers, of which the following is a full, clear, concise, and exact description, reference being had to the accompanying drawings, forming a part of this specification.

My invention relates to improvements in conveyors and has special reference to an improved conveyor takeup and adjustable delivery roller.

The object of my invention is to provide a delivery device which shall be readily adjustable as to height to cause the delivery of bales, bags, etc., at a suitable height for piling, which shall be effective to aid in the removal of bags, bales, etc., out of the path of the moving parts of the conveyor so that the containers will not be torn or broken, or the conveyor injured and to provide a combined conveyor takeup and adjustable delivery roller of simple and efficient character.

The device of my invention also guards the attendant or operator from accidental contact with the moving parts of the carrier. The delivery roller should preferably be placed close to the end of the carriage so that a commodity or article will be taken off of the carriage for delivery to the attendant with the minimum opportunity for accidental catching or tearing of the commodity or article. It is also desirable that the delivery roll be adjustable as to angular position about the sprocket over which the carriage returns, so that the commodities to be delivered may be taken off at the proper angle for the best delivery.

If the delivery roller be pivoted at a fixed point adjacent the end of the conveyor arm then it will interfere with another requirement, namely, the takeup for tightening the carriage. The takeup must be provided at the upper end of the conveyor arm because the lower end is fixedly connected to the driving mechanism. I have overcome these difficulties by mounting the radius arm of the delivery roll upon a movable part which may be adjusted when the takeup is adjusted, so that the position of the delivery roll with respect to the end of the apron may always be the same. Preferably I mount the said radius arm directly upon the adjustment of the takeup of the carriage.

My invention will be more readily understood by reference to said drawings, in which:

Figure 2 is a fragmentary top plan view thereof;

Figure 3 is a fragmentary transverse vertical section of the conveyor on the line 3—3 of Figure 2, and especially showing the relation of the power shaft, conveyor and tracks;

Figure 4 is a diagrammatic fragmentary side elevation illustrative of the practical application of my improvements;

Figure 5 is a fragmentary detailed vertical section on the line 5—5 of Figure 1;

Figure 6 is a similar horizontal section on the line 6—6 of Figure 1;

Figure 7 is a view similar to 4, illustrating a preferred form of my invention;

Figure 8 is a fragmentary substantially vertical section on the line 8—8 cf Figure 7;

Figure 9 is a side view of the adjustable arm and its mounting;

Figure 10 is a side view similar to the above, but with the clutch collar removed;

Figure 11 is a fragmentary view showing a side elevation of the clutch collar; and, Figure 12 is a fragmentary vertical section on the line 12—12 of Figure 8.

Figure 1:
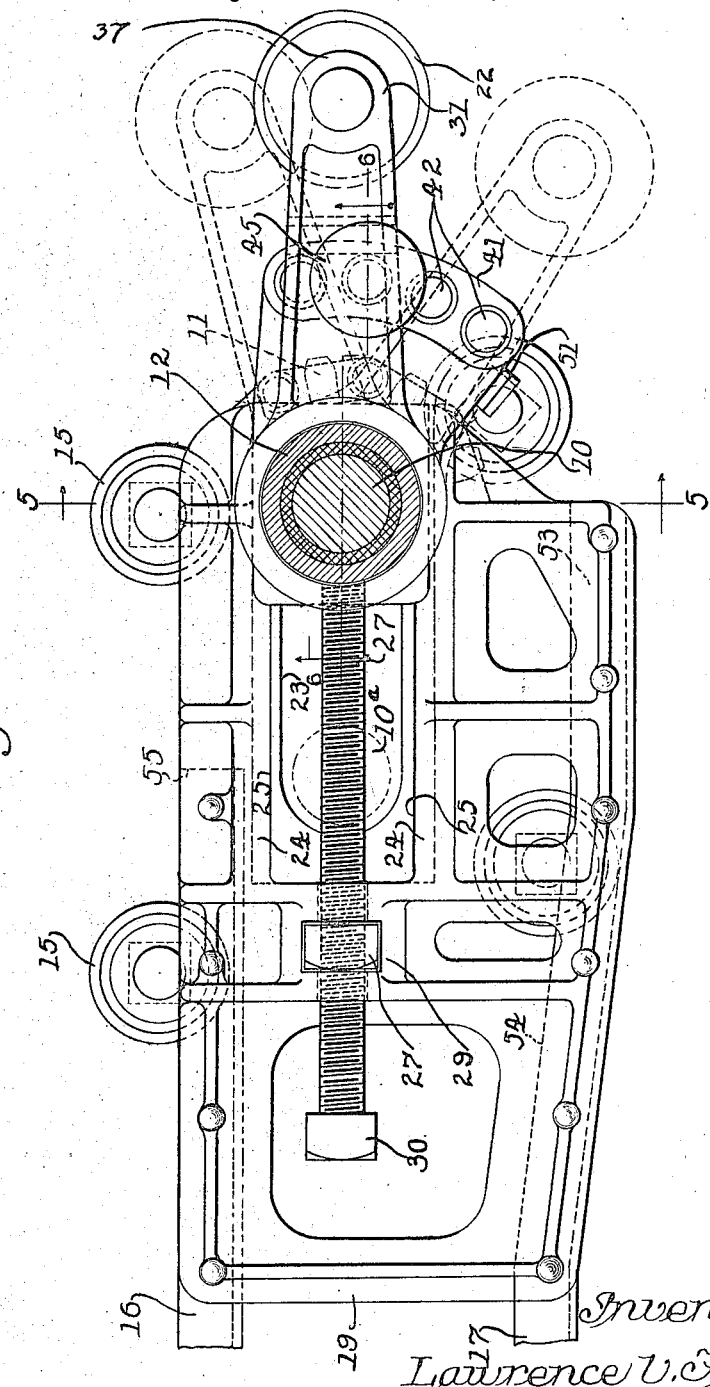
Figure 1 is a side elevation, partly in section on the line 1—1 of Figure 2; of a combined takeup and adjustable delivery roller embodying my invention.

The improved takeup and adjustable delivery roller, as illustrated in the drawings, comprises a conveyor head shaft 10, provided with spaced sprockets 11, secured thereon for rotation therewith. The shaft is mounted for rotation in bearings 12, which are adjustable in the conveyor head in the manner and for the purpose hereinafter set forth.

The conveyor with which my improvement is associated has a travelling carriage formed of a plurality of transverse bars 13, or conveyor slats spaced at uniform distances, and joined by two chains 14 adapted to engage the sprocket wheels 11. The bars are preferably provided with supporting wheels 15 on their ends, adapted to run on upper angle iron tracks 16 and lower similar tracks 17. The type of carriage may be varied without affecting the present invention.

These tracks are arranged with one flange of each in vertical position and adapted to guide the conveyor and the other flange horizontal to provide a runway or track for wheels 15 to support the conveyor. The chains 14 are connected to the inner surfaces or sides of the axles 13 and the apron slats by means of wing attachments extending from the sides of the proper links of the chain. These links are secured rigidly to the bars by rivets 18 at their ends.

The conveyor head as illustrated comprises a skeleton frame 19, one at each side of the conveyor. The tracks 16 and 17 are riveted to the inner faces of these frames at the upper and lower edges thereof, so as to produce a substantial and rigid conveyor head. The several tracks are built into a rigid frame structure by suitable diagonals 16' and cross bars 17' as best shown in Figure 3. In use, as best illustrated in Figure 4, the head 19 is supported on the tracks 16 and 17 which are suitably supported at their opposite ends upon bearings 10' mounted on the power shaft 10'' at the opposite or lower end of the structure, so that the conveyor as a whole can be swung up and down to position the head at the height desired for delivering the packages carried thereby, such as the bags 21. As illustrated in Figure 4 the bags 21 are carried up by the carriage, which encircles the shaft 10, returning on the lower track, and thereby the carriage drops the bags off at the upper end. In piling bags of material, such as grain, cement, etc., it is desirable to eliminate as much manual labor as possible and to make the delivery as easy as possible and to reduce to a minimum the possibility of tearing the bags.

If the bags were deposited upon a platform from the conveyor from the carriage as it passes around the shaft 10, or if the delivery roller were spaced too far away, they would come to rest with their rear ends in the path of the conveyor cross bars 13 which would continue to catch, rub or possibly tear the bags. One of the special objects of my invention is to eliminate this difficulty and cause the delivery of the bags to such position as to be out of the path of the conveyor carriage. For this purpose a delivery roller 22 which extends the full width of the conveyor is mounted at a point beyond the delivery end of the conveyor. This roller is adapted to receive the bags 21 or other commodities as they leave the conveyor and take them out of the path of the carriage, as illustrated in Figure 4. To allow for the different inclinations of the conveyor and to cause the roller 22 to best co-operate therewith to fulfill its desired function, the roller 22 is supported in such manner that it is readily adjustable vertically or radially relatively to the delivery end of the conveyor and will yet retain a fixed distance therefrom, even when the shaft 10 is adjusted longitudinally of the carriage to regulate the tension thereof, or to take up the slack therein. For this purpose the bearings 12 for the shaft 10 are so mounted that they are adjustable longitudinally of the conveyor. Each side frame 19 is provided with a longitudinal slot or opening 23 thru which the shaft 10 projects. Longitudinal flanges 24, above and below these openings, form a longitudinal guide in which the shaft bearing or box 12 is received and in which it is movable. Guide ribs 25 at the outer edges of these flanges extend the whole length thereof and are adapted to enter guide grooves 26 in the tops and bottoms of the bearings 12 and guide them along the channel. The channel extends to the extreme end of the head and as shown in Figure 1 the bearing 12 can be positioned at the extreme end of the head, or as indicated by the dotted circle 10$^a$, can be drawn back enough to allow for all necessary adjustments in the length of the carriage. To force the shaft 10 outwardly and hold it in its adjusted position each side frame is provided with an adjusting screw 27 projecting between the flanges 24 and its free end engaging in a socket 28 provided in the bearing 12. For making the screw effective to adjust the shaft I provide a threaded nut 27' mounted in a socket or opening 29 in the side frame, and thru which the screw 27 is threaded. The nuts 27' preferably are square and the sockets 29 are of similar shape to receive the nuts and prevent their turning with the screw 27; the rear or free end of the screw has a square head 30 to facilitate the turning of the screw with a suitable wrench. By turning the screw in one direction the box 12 can be pushed toward the outer end of the frame to take up the slack in the carriage, and by backing the screw the box can be moved inwardly, the weight or tension of the carriage is sufficient at all times to retain the bearings in contact with the screws.

The roller 22 is mounted on a shaft 31. Preferably the roller is made of a piece of pipe and suitable heads 32 are fitted within the ends of the pipe and are also fitted upon the shaft and secured thereon by suitable set screws. The shaft 31 is mounted in the outer ends 33 of vertically adjustable arms 34 and these arms are adjustably mounted on the bearings 12, the bearings having cylindrical end portions 35 projecting beyond the side frame flanges 24, for this purpose, and upon which projections the inner ends 36 of the arms 34 are rotatably mounted. The outer ends 33 of the arms 34 are provided with bearing hubs 37 for receiving the ends of the shaft 31 and in which the shaft 31 is freely rotatable. The roller 22 is consequently an idler and is free to rotate by the movement of the commodity over the same. The arms 34 are retained on the projections 35 by means of suitable collars 38 secured upon the outer ends of said projections 35 by set screws 39. To hold the arms 34 in their adjusted positions with the roller 22 at its desired height relatively to the delivery end of the carriage each bearing 12 has a rigid arm 40 projecting forward therefrom and arranged at the inner face of the arm 34. The free end 41 of the arm 40 is in the form of a segment having a plurality of holes 42 arranged concentric with the shaft 10 and adapted to receive a stop pin 43 carried by the arm 34. The pin 43 is mounted in a boss or projection 44 on the arm 34. The pin has a head 45 by which it can be moved. The pin 43 projects from the arm 34 and engages in the holes 42. It may be withdrawn out of the holes to permit the vertical adjustment of the roller 22. The pin is normally held in locking position by a compression spring 46 which is mounted within the boss 44 and arranged between the shoulder 47 on the pin and the opposing shoulder 48 within the boss 44. To lock the arms 34 to the rigid arms 40 and thus hold the shaft 31 and roller 22 against endwise displacement, the arm 34 has a rigid hook 49 lateral around the outer end of the arm 40 and engaging the inner face thereof. To retain the shaft 31 properly positioned longitudinally relatively to the arms 34, set collars 50 are mounted on the shaft adapted to contact with the inner sides or faces of the arms 34. To prevent the roller 22 and its supporting structure dropping too low, when the pins 43 are withdrawn for adjusting the height of the roller, stop lugs 51 project from the lower edges of the rigid arms 40 and into the path of the adjustable arms 34 to engage the lower edges thereof. To prevent the strains of operation spreading the flanges 25 apart, the frame has a vertical tie-bar or member 52 at the outer end of the opening 23.

The shaft 10 itself serves to tie the two side frames 19 together and for this purpose set collars 10' are provided on the outer ends of the shaft just beyond the outer ends of the bearings 12 and adapted to contact therewith.

As the carriage makes the turn around the shaft 10 the natural drop off in the carriage permits the cross bars 13 with their wheels 15 to drop away from the sprocket wheels 11. The entry of the wheels 15 upon the lower track 17 is insured by depressing the forward ends 53 of these lower tracks to provide ample clearance space between their ends and the shaft 10. The lower tracks 17 between their ends and the middle portion thereof, as shown at 54, lie upon a gradual inclination so that the wheels 15 will engage the tracks without shock and rising along the gentle inclination will be brought back to normal distance from the upper track 16.

In order to permit the free turning of the carriage around the shaft, particularly when the shaft is at the inner limit of its adjustment, the upper tracks 16 are cut short at 55, substantially even with the said inner position of the shaft and in the place of the vertical flanges of the tracks 16 I provide integral tracks 56, providing continuous side guides for the wheels 15 in the plane of the inner surface of the vertical flange of the track, and continue this thickening around the outer edge of the frame for the same purpose.

In Figures 7 to 12 inclusive, I have illustrated the preferred form of adjustable mounting of the idle roller 22 concentric with the shaft 10. In this form I provide the conveyor head side frames 19 like those already described, and carrying adjustable boxes 60 similar to the boxes 12, and provided with longitudinal grooves 61 top and bottom, to receive the flanges 24 of the conveyor heads. The adjustable arms 62 which carry the roller 22 at their outer ends are mounted at their inner ends on the boxes 60 which are provided with concentric cylindrical bearing portions 63 for this purpose. Each box 60 is provided with a flange 64 forming a shoulder at the inner end of the cylindrical bearing 63 and against which the inner faces of the arms 62 contact. The arms 62 are freely adjustable up and down around the shaft 10 and on the bearings 63. To hold the arms 62 in their adjusted positions I provide the outer faces of the inner ends of the arms with radial clutch teeth 65 adapted to engage with similar radial clutch teeth 66 formed on a hub or collar 67, which in turn is mounted on the outer end 68 of the box 60. I make this outer end 68 polygonal in shape, preferably square in cross-section as shown, and I provide the collar 67 with a square central hole to fit on the square bearing and adapted to permit the collar 67 to slide back and forth thereon to free the teeth 65 to permit the arm 62 to be adjusted, or to engage with the teeth 66 and hold the arm in adjusted position. The teeth 65 and 66 are uniformly spaced on the two members and permit them to be engaged in many relative positions to hold the roller 22 at any desired height relatively to the shaft 10, or in other words relatively to the delivery end of the carriage. To hold the roller 67 in engaging position, I provide a set screw 69 having a winged head 70 and mounted in a threaded opening in the collar 67, and I provide a hole 71 in the outer end 68 of the bearing 60 to receive the inner end of the screw. The boxes 60 are held against rotation by the engagement of the flanges 24 in the grooves 61, the collars 67 are held against rotation by the square ends of the boxes 60 upon which the collars fit, and the arms 62 are held against rotation by the engagement of the teeth on the arms with the teeth on the collars 67.

It will now be understood that by means of the improved combined takeup and adjustable delivery roller, it is possible to adjust the shaft 10 to take up the slack of the carriage. This adjustment does not vary the relative position of the roller 22, at the end of the conveyor with respect to the carriage, and that it is possible to adjust the roller 22 vertically, relatively to the shaft 10 to effect the desired delivery of the commodities carried by the carriage.

I claim:

1. The herein described improvement in conveyors, comprising a flexible carriage, a horizontal shaft having sprocket wheels around which the carriage is trained, an idler roller positioned beyond the shaft, bearings for said shaft for taking up said carriage, arms pivoted on said bearings, said roller being rotatably mounted in the free ends of the said arms, and means rigid with said bearings for holding said arms.

2. The herein described improvement, comprising a conveyor shaft having sprocket wheels around which a carriage is adapted to be trained, a carriage head, bearings on said head for said shaft, means by which said bearings are adjustable for adjusting the carriage, arms pivotally mounted on said bearings, an idler roller rotatably mounted in the free ends of said arms, segments rigid with said bearings, means for locking said arms to said segments, at a plurality of points, for holding the roller at various heights.

3. The herein described improvement, comprising a carriage shaft having sprocket wheels around which a carriage is adapted to be trained, a carriage head, bearings on said head for said shaft, a carriage head frame upon which the shaft is carried, bearings slidingly mounted on the frame and in which the shaft is rotatably mounted, adjusting screws carried by the frame and engaging said bearings, arms pivotally mounted to swing around said shaft, a delivery roller rotatably carried by said arms, and means for engaging said arms with said bearings to hold the arms relatively to the bearings.

4. The improvements herein described, comprising a shaft having sprocket wheels around which a carriage is adapted to be trained, a frame work on which said shaft is movable to take up the carriage bearings carried by said frame work in which said shaft is rotatably mounted, rigid projections on said bearings, an idle roller arranged beyond said shaft, arms pivotally mounted on said bearings and in the free ends of which said roller is rotatably mounted, means carried by said arms for engaging said projections to hold the arms in adjusted positions, and means holding said arms in engagement with the free ends of said projections to hold said arms and roller transversely relatively to the shaft.

5. The herein described improvement comprising a shaft having sprocket wheels around which a carriage is adapted to be trained, a frame work on which said shaft is mounted and movable for taking up the carriage, bearings slidingly mounted on said frame work in which said shaft is rotatably mounted, rigid projections on said bearings, an idle roller arranged beyond said shaft adapted to receive articles conveyed by said conveyor, arms rotatably mounted on said bearings and in the free ends of which said roller is rotatably mounted, hooked projections on said arms extending around said projections to hold the arms in engagement with said projections, and means for holding the arms in vertically adjusted positions.

6. The herein described improvement, comprising a shaft having sprocket wheels around which a carriage is adapted to be trained, a frame work on which said shaft is mounted and movable for taking up the carriage, bearings slidingly mounted on said frame work in which said shaft is rotatably mounted, rigid projections on said bearings, an idle roller arranged beyond said shaft adapted to receive articles conveyed or elevated by said carriage, arms rotatably mounted on said bearings and in the free ends of which said roller is rotatably mounted, hooked projections on said arms extending around said projections to hold the arms in engagement with said projections, said projections each having a series of holes arranged concentric with said conveyor shaft, and a spring pressed pin carried by each of said arms for engaging in said holes to hold the arms and the idle roller in adjusted positions.

7. The herein described improvement comprising a shaft having sprocket wheels around which a carriage is adapted to be trained, a frame work having slots in which said shaft is mounted and movable for taking up the carriage, bearings slidingly mounted on said frame work in which said shaft is rotatably mounted, rigid projections on said bearings, an idle roller arranged beyond said shaft adapted to receive articles conveyed or elevated by said carriage, arms rotatably mounted on said bearings and in the free ends of which said roller is rotatably mounted, hooked projections on said arms extending around said projections said rigid projections each having a series of holes arranged in a row concentric with said shaft, and a spring pressed locking pin carried by each of said arms for engaging in said holes, and stop projections at the lower edges of said rigid projections for engaging said arms to limit their movement in one direction.

8. In a conveyor, a carriage head comprising side frames, tracks secured to the upper and lower edges of the side frames, a shaft around which the carriage is trained the side frames having longitudinal slots thru which said shaft projects, a bearing for the shaft movable on each side frame, tongue and groove connections between the bearings and side frame for guiding the bearings, means carried by the side frames for adjusting the bearings, and an idle roller arranged beyond said shaft, arms pivotally mounted on said bearings in the free ends of which said roller is mounted, means retaining said arms on said bearings.

9. The herein described improvement in conveyors, comprising a carriage head consisting of two side frames, upper and lower angle bar tracks, one side of each track being vertical to form lateral conveyor guards and the other side of each being horizontal to form wheel tracks, the vertical flanges secured upon the inner faces of said side frames, a shaft around which the conveyor is trained, the shaft movable in said side frames for adjusting the carriage, the upper angle bar tracks terminating at the inner limit of movement of said shaft, said side frames having integral tracks abutting the ends of the upper bar track, said integral tracks forming a continuation of said first tracks.

10. In combination, a conveyor arm having a shaft adjacent its free end, a carriage comprising a plurality of transverse carrying rods or slats having rollers upon the ends thereof, tracks on the upper and the lower sides of the arm for guiding the rollers, said carriage being trained over said shaft, a delivery roller mounted on the free end of the arm and adjustable up or down with respect to the free end of the arm to deliver commodities at a higher or lower level and means for rigidly holding the delivery roller to the free end of the conveyor arm in any desired position.

11. In combination, a conveyor arm having a free upper end, a guide at said free end, a sliding bearing in said guide, a shaft journaled in said bearing, a carriage trained over said shaft, means for moving the bearing to take up the slack of the carriage, an arm pivoted concentrically with the shaft, and a delivery roller supported on the arm.

12. In combination, a conveyor arm having a free upper end, a guide at said free end, a sliding bearing in said guide, a shaft journaled in said bearing, a carriage trained over said shaft, means for moving the bearing to take up the slack of the carriage, an arm pivoted concentrically with the shaft, a delivery roller supported on the arm, and means for rigidly connecting the roller arm and the bearing in any desired position.

13. In combination, a conveyor arm having a free upper end, an endless carriage traveling on said arm, a take-up mechanism at said upper end for taking up the slack of said endless carriage, a delivery roller carried adjacent said upper end, said delivery roller maintaining a fixed distance from the delivery end of said endless carriage independently of the adjustment of said take-up mechanism.

In witness whereof, I hereunto subscribe my name, this 29th day of March, A. D., 1919.

LAWRENCE V. FRALEY.